United States Patent
Lee

(10) Patent No.: US 7,899,107 B1
(45) Date of Patent: *Mar. 1, 2011

(54) PREAMBLE DETECTION USING LOW-COMPLEXITY CROSS-CORRELATION

(75) Inventor: Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 732 days.

This patent is subject to a terminal disclaimer.

(21) Appl. No.: 11/732,095

(22) Filed: Apr. 2, 2007

Related U.S. Application Data

(60) Provisional application No. 60/792,508, filed on Apr. 17, 2006, provisional application No. 60/809,733, filed on May 31, 2006.

(51) Int. Cl.
*H04B 1/00* (2006.01)
(52) U.S. Cl. .......................... 375/141; 375/130
(58) Field of Classification Search .............. 375/141, 375/140, 130; 370/319; 342/150
See application file for complete search history.

(56) References Cited

U.S. PATENT DOCUMENTS

| | | | |
|---|---|---|---|
| 3,983,485 A * | 9/1976 | Stuart ........................ | 375/269 |
| 5,067,136 A | 11/1991 | Arthur et al. | |
| 5,852,630 A | 12/1998 | Langberg et al. | |
| 5,940,429 A | 8/1999 | Lam et al. | |
| 6,215,827 B1 * | 4/2001 | Balachandran et al. ..... | 375/262 |
| 6,266,361 B1 | 7/2001 | Huang et al. | |
| 7,006,577 B2 | 2/2006 | Kim | |
| 7,020,183 B2 | 3/2006 | Nakamura | |
| 7,095,778 B2 | 8/2006 | Okubo et al. | |
| 7,133,688 B2 | 11/2006 | Das et al. | |
| 7,257,165 B2 | 8/2007 | Gardner | |
| 7,333,548 B2 | 2/2008 | Chen | |
| 7,362,832 B2 | 4/2008 | Yoshida | |
| 7,366,222 B2 * | 4/2008 | Song et al. ................ | 375/130 |
| 7,386,058 B2 * | 6/2008 | Fujii ......................... | 375/267 |
| 7,580,490 B2 | 8/2009 | Suh et al. | |
| 7,590,193 B2 * | 9/2009 | Han, II ...................... | 375/326 |
| 7,596,111 B2 * | 9/2009 | Karabinis .................. | 370/316 |
| 7,623,467 B1 * | 11/2009 | Sun et al. .................. | 370/252 |
| 7,643,536 B2 | 1/2010 | Schaefer et al. | |
| 7,656,931 B2 | 2/2010 | Smith et al. | |
| 2004/0136442 A1 * | 7/2004 | Laurent ..................... | 375/136 |
| 2005/0047384 A1 | 3/2005 | Wax et al. | |

(Continued)

OTHER PUBLICATIONS

IEEE Standard for Local and Metropolitan Area Networks "Part 16: Air Interface for Fixed Broadband Wireless Access Systems"—893 Pages.

(Continued)

*Primary Examiner* — David C Payne
*Assistant Examiner* — Brian J Stevens

(57) ABSTRACT

A system includes a differential demodulation module that differentially demodulates modulated signals. A cross-correlation module generates cross-correlation values by cross-correlating states of X symbols in the differentially demodulated signals with corresponding states of X predetermined symbols in each of Y preamble sequences, and determines whether one of the Y preamble sequences is present in the modulated signals, where X and Y are integers greater than 1. The cross-correlation module includes a state detection module that detects the states of the X symbols in the differentially demodulated signals, where each of the X symbols has one of a first state and a second state, and a summing module that generates the cross-correlation values by generating X sums for each of the Y preamble sequences by adding each of the states of the X symbols with the corresponding states of the X predetermined symbols in each of the Y preamble sequences.

46 Claims, 12 Drawing Sheets

U.S. PATENT DOCUMENTS

| | | |
|---|---|---|
| 2005/0063480 A1 | 3/2005 | Sang et al. |
| 2005/0243937 A1 | 11/2005 | Legouable et al. |
| 2006/0025136 A1 | 2/2006 | Fujita et al. |
| 2006/0034397 A1 | 2/2006 | Lee et al. |
| 2006/0082445 A1* | 4/2006 | O'Toole et al. .............. 340/10.4 |
| 2006/0221807 A1 | 10/2006 | Fukuoka et al. |
| 2006/0222058 A1 | 10/2006 | Simic et al. |
| 2007/0058524 A1 | 3/2007 | Modlin et al. |
| 2007/0183306 A1 | 8/2007 | Akita et al. |
| 2008/0086670 A1 | 4/2008 | Krouk et al. |

OTHER PUBLICATIONS

IEEE Standard for Local and metropolitan Area Netorks "Part 16: Air Interface for Fixed and Mobile Broadband Wireless Access Systems—Amendment 2: Physical and Medium Access Control Layers for Combined Fixed and Mobile Operation in Licensed Bands and Corrigendum 1"—864 Pages.

WiMaX XX xxx xxx v0.1.2(Feb. 2006); "Mobile WiMAX System Profile"—Wimax forum.—90 Pages.

* cited by examiner

Preamble modulation series per segment and IDcell for the 1K FFT mode

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |
| 4 | 4 | 0 | 0x82F8A0AB918138D84BB86224F6C342D81BC8BFE791CA9EB54096159D672E91C6E13032F |
| 5 | 5 | 0 | 0xEE27E59B84CCF15BB1565EF90D478CD2C49EE8A70DE368EED7C9420B0C6FFAF9AF035FC |
| 6 | 6 | 0 | 0xC1DF5AE28D1CA6A8917BCDAF4E73BD93F931C44F93C3F12F0132FB643EFD5885C8B2BCB |
| 7 | 7 | 0 | 0xFCA36CCCF7F3E0602696DF745A68DB948C57DFA9575BEA1F05725C42155898F0A63A248 |

PREAMBLE DETECTION USING LOW-COMPLEXITY CROSS-CORRELATION

This application claims the benefit of U.S. Provisional Application No. 60/792,508, filed on Apr. 17, 2006, and U.S. Provisional Application No. 60/809,733, filed on May 31, 2006. The disclosures of the above applications are incorporated herein by reference in their entirety.

FIELD

The present disclosure relates to communication systems, and more particularly to detecting preamble sequences in systems using orthogonal frequency domain multiplexing (OFDM).

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Referring now to FIG. 1, a typical communication system 10 comprises an information source 12, a transmitter 13, a communication channel 20, a receiver 27, and a destination 28. The transmitter 13 comprises a source encoder 14, a channel encoder 16, and a modulator 18. The receiver 27 comprises a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

Communication systems use different modulation schemes to modulate and transmit data. For example, a radio frequency (RF) carrier may be modulated using techniques such as frequency modulation, phase modulation, etc. In wireline communication systems, a transmitted signal generally travels along a path in a transmission line between a transmitter and a receiver.

In wireless communication systems, however, a transmitted signal may travel along multiple paths. This is because the transmitted signal may be reflected and deflected by objects such as buildings, towers, airplanes, cars, etc., before the transmitted signal reaches a receiver. Each path may be of different length. Thus, the receiver may receive multiple versions of the transmitted signal. The multiple versions may interfere with each other causing inter symbol interference (ISI). Thus, retrieving original data from the transmitted signal may be difficult.

To alleviate this problem, wireless communication systems often use a modulation scheme called orthogonal frequency division multiplexing (OFDM). In OFDM, a wideband carrier signal is converted into a series of independent narrowband sub-carrier signals that are adjacent to each other in frequency domain. Data to be transmitted is split into multiple parallel data streams. Each data stream is modulated using a sub-carrier. A channel over which the modulated data is transmitted comprises a sum of the narrowband sub-carrier signals, which may overlap.

When each sub-carrier closely resembles a rectangular pulse, modulation can be easily performed by Inverse Discrete Fourier Transform (IDFT), which can be efficiently implemented as an Inverse Fast Fourier Transform (IFFT). When IFFT is used, the spacing of sub-carriers in the frequency domain is such that when the receiver processes a received signal at a particular frequency, all other signals are nearly zero at that frequency, and ISI is avoided. This property is called orthogonality, and hence the modulation scheme is called orthogonal frequency division multiplexing (OFDM).

Referring now to FIGS. 2A-2C, a wireless communication system 50 may comprise base stations BS1, BS2, and BS3 (collectively BS) and one or more mobile stations (MS). Each BS may comprise a processor 30, a medium access controller (MAC) 32, a physical layer (PHY) module 34, and an antenna 36 as shown in FIG. 2B. Similarly, each MS may comprise a processor 40, a medium access controller (MAC) 42, a physical layer (PHY) module 44, and an antenna 46 as shown in FIG. 2C. The PHY modules 34 and 44 may comprise radio frequency (RF) transceivers (not shown) that transmit and receive data via antennas 36 and 46, respectively. Each BS and MS may transmit and receive data while the MS moves relative to the BS.

Specifically, each BS may transmit data using orthogonal frequency division multiplexing access (OFDMA) system. Each BS may transmit data typically in three segments: SEG1, SEG2, and SEG3. The MS, which moves relative to each BS, may receive data from one or more base stations depending on the location of the MS relative to each BS. For example, the MS may receive data from SEG 3 of BS1 and SEG 2 of BS2 when the MS is located as shown in FIG. 2A.

Relative motion between MS and BS may cause Doppler shifts in signals received by the MS. This can be problematic since systems using OFDM are inherently sensitive to carrier frequency offsets (CFO). Therefore, pilot tones are generally used for channel estimation refinement. For example, some of the sub-carriers may be designated as pilot tones for correcting residual frequency offset errors.

Additionally, the PHY module 34 of each BS typically adds a preamble to a data frame that is to be transmitted. Specifically, the PHY module 34 modulates and encodes the data frame comprising the preamble at a data rate specified by the MAC 34 and transmits the data frame. When the PHY module 44 of the MS receives the data frame, the PHY module 44 uses the preamble in the data frame to detect a beginning of packet transmission and to synchronize to a transmitter clock of the BS.

According to the I.E.E.E. standard 802.16e, which is incorporated herein by reference in its entirety, a first symbol in the data frame transmitted by the BS is a preamble symbol from a preamble sequence. The preamble sequence typically contains an identifier called IDcell, which is a cell ID of the BS, and segment information. The BS selects the preamble sequence based on the IDcell and the segment number of the BS. Each BS may select different preamble sequences. Additionally, each BS may select preamble sequences that are distinct among the segments of that BS.

The BS modulates multiple sub-carriers with the selected preamble sequence. Thereafter, the BS performs IFFT, adds a cyclic prefix, and transmits a data frame. The MS uses the cyclic prefix to perform symbol timing and fractional carrier frequency synchronization. Unless the MS knows the preamble sequence, however, the MS cannot associate itself to a particular segment of a particular BS.

SUMMARY

A system comprises a differential demodulation module and a cross-correlation module. The differential demodulation module differentially demodulates modulated signals and generates differentially demodulated signals. The cross-correlation module generates cross-correlation values by cross-correlating states of X symbols in the differentially demodulated signals with corresponding states of X predetermined symbols in each of Y preamble sequences, where X is an integer greater than 1, and Y is an integer greater than 0. The cross-correlation module determines whether one of the Y preamble sequences is present in the modulated signals based on the cross-correlation values.

In another feature, the correlation module comprises a state detection module and a summing module. The state detection module detects the states of the X symbols in the differentially demodulated signals, where each of the X symbols has one of a first state and a second state. The summing module receives the Y preamble sequences and generates X sums for each of the Y preamble sequences by adding each of the states of the X symbols with the corresponding states of the X predetermined symbols in each of the Y preamble sequences. The X sums are modulo-2 sums.

In another feature, the modulated signals include sub-carriers that are modulated using orthogonal frequency domain multiplexing (OFDM). Every $P^{th}$ one of the sub-carriers is modulated with a preamble symbol from one of the Y preamble sequences, where P is an integer greater than or equal to 1.

In another feature, every $P^{th}$ one of the sub-carriers has one of substantially the same channel phase and substantially the same differential channel phase.

In another feature, the differential demodulation module generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the states of the X symbols in the differentially demodulated signals are states of real parts of the differentially demodulated signals when imaginary parts of the differentially demodulated signals are approximately equal to zero.

In another feature, the states of the X predetermined symbols in the Y preamble sequences are generated by inverting states of derived symbols in derived preamble sequences that are derived from the Y preamble sequences, and wherein each of the Y preamble sequences is different from others of the Y preamble sequences.

In another feature, each of the derived symbols of one of the derived preamble sequences has a first binary value when a corresponding symbol and a symbol adjacent to the corresponding symbol in a corresponding one of the Y preamble sequences have opposite binary values, and the each of the derived symbols has a second binary value that is opposite to the first binary value when the corresponding symbol and the symbol adjacent to the corresponding symbol have the same binary value.

In another feature, the derived preamble sequences have a cross-correlation that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the summing module generates the cross-correlation values by adding the X sums generated for each of the Y preamble sequences.

In another feature, the cross-correlation module further comprises a control module that communicates with the differential demodulation module and the summing module, that selects a largest one of the cross-correlation values, and that detects one of the Y preamble sequences in the modulated signals when the largest one of the cross-correlation values is greater than or equal to a predetermined threshold. The predetermined threshold is based on the signal strength of the modulated signals.

In another feature, the control module identifies a segment of a base station that transmitted the modulated signals based on the one of the Y preamble sequences detected in the modulated signals.

In another feature, the control module selects the largest one of the cross-correlation values based on the signal strength of the modulated signals.

In another feature, the system further comprises a correlation module that communicates with the differential demodulation module and the control module and that generates correlation values by correlating at least one of the differentially demodulated signals and at least one of derived preamble sequences that is derived from the Y preamble sequences. At least one of the derived preamble sequences generates at least two of the cross-correlation values that are greater than the predetermined threshold and that are substantially the same.

In another feature, the control module selects one of the correlation values having a largest real part, detects one of the Y preamble sequences in the modulated signals based on the largest real part, and identifies a segment of a base station that transmitted the modulated signals based on the one of the Y preamble sequences detected in the modulated signals.

In another feature, the control module selects one of the correlation values having a largest magnitude, detects one of the Y preamble sequences in the modulated signals based on the largest magnitude, and identifies a segment of a base station that transmitted the modulated signals based on the one of the Y preamble sequence detected in the modulated signals.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, the control module generates an estimate for an integer carrier frequency offset (CFO) present in the modulated signals when the control module selects the largest one of the cross-correlation values.

In another feature, a physical layer (PHY) module comprises the system and further comprises a transceiver module that communicates with the differential demodulation module and that receives the differentially modulated signals.

In another feature, a network device comprises the PHY module and further comprises at least one antenna that communicates with the transceiver module.

In still other features, a method comprises generating differentially demodulated signals by differentially demodulating modulated signals that include sub-carriers that are modulated using orthogonal frequency domain multiplexing (OFDM). The method further comprises generating cross-correlation values by cross-correlating states of X symbols in the differentially demodulated signals with corresponding states of X predetermined symbols in each of Y preamble sequences, where X is an integer greater than 1, and Y is an integer greater than 0. The method further comprises determining whether one of the Y preamble sequences is present in the modulated signals based on the cross-correlation values.

In another feature, the method further comprises detecting the states of the X symbols in the differentially demodulated signals, where each of the X symbols has one of a first state and a second state. The method further comprises generating X sums for each of the Y preamble sequences by adding each of the states of the X symbols with the corresponding states of the X predetermined symbols of each of the Y preamble sequences, where the X sums are modulo-2 sums.

In another feature, every $P^{th}$ one of the sub-carriers is modulated with a preamble symbol from one of the Y preamble sequences, where P is an integer greater than or equal to 1. Every $P^{th}$ one of the sub-carriers has one of substantially the same channel phase and substantially the same differential channel phase.

In another feature, the method further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the method further comprises determining the states of the X symbols in the differentially demodulated signals as states of real parts of the differentially demodulated signals when imaginary parts of the differentially demodulated signals are approximately equal to zero.

In another feature, the method further comprises generating the states of the X predetermined symbols in the Y preamble sequences by inverting states of derived symbols in derived preamble sequences that are derived from the Y preamble sequences.

In another feature, the method further comprises generating each of the derived symbols of one of the derived preamble sequences having a first binary value when a corresponding symbol and a symbol adjacent to the corresponding symbol in a corresponding one of the Y preamble sequences have opposite binary values, and having a second binary value that is opposite to the first binary value when the corresponding symbol and the symbol adjacent to the corresponding symbol have the same binary value.

In another feature, each of the Y preamble sequences is different from others of the Y preamble sequences, and wherein the derived preamble sequences have a cross-correlation that is less than or equal to a predetermined cross-correlation threshold. The predetermined cross-correlation threshold is less than approximately 0.2 for an orthogonal frequency domain multiplexing (OFDM) method using a 1024 fast Fourier transform (FFT) mode.

In another feature, the method further comprises generating the cross-correlation values by adding the X sums generated for each of the Y preamble sequences.

In another feature, the method further comprises selecting a largest one of the cross-correlation values and detecting one of the Y preamble sequences in the modulated signals when the largest one of the cross-correlation values is greater than or equal to a predetermined threshold. The predetermined threshold is based on the signal strength of the modulated signals.

In another feature, the method further comprises identifying a segment of a base station that transmitted the modulated signals based on the one of the Y preamble sequences detected in the modulated signals.

In another feature, the method further comprises selecting the largest one of the cross-correlation values based on the signal strength of the modulated signals.

In another feature, the method further comprises generating correlation values by correlating at least one of the differentially demodulated signals and at least one of derived preamble sequences that is derived from the Y preamble sequences. At least one of derived preamble sequences generates at least two of the cross-correlation values that are greater than the predetermined threshold and that are substantially the same.

In another feature, the method further comprises selecting one of the correlation values having a largest real part, detecting one of the Y preamble sequences in the modulated signals based on the largest real part, and identifying a segment of a base station that transmitted the modulated signals based on the one of the Y preamble sequences detected in the modulated signals.

In another feature, the method further comprises selecting one of the correlation values having a largest magnitude, detecting one of the Y preamble sequences in the modulated signals based on the largest magnitude, and identifying a segment of a base station that transmitted the modulated signals based on the one of the Y preamble sequence detected in the modulated signals.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, the method further comprises generating an estimate for an integer carrier frequency offset (CFO) present in the modulated signals when selecting the largest one of the cross-correlation values.

In still other features, a system comprises differential demodulation means for differentially demodulating modulated signals and generating differentially demodulated signals. The system further comprises cross-correlation means for generating cross-correlation values by cross-correlating states of X symbols in the differentially demodulated signals with corresponding states of X predetermined symbols in each of Y preamble sequences and determining whether one of the Y preamble sequences is present in the modulated signals based on the cross-correlation values, where X is an integer greater than 1, and Y is an integer greater than 0.

In another feature, the cross-correlation means comprises state detection means for detecting the states of the X symbols in the differentially demodulated signals, where each of the X symbols has one of a first state and a second state. The cross-correlation means further comprises summing means for receiving the Y preamble sequences and generating X sums for each of the Y preamble sequences by adding each of the states of the X symbols with the corresponding states of the X predetermined symbols in each of the Y preamble sequences. The X sums are modulo-2 sums.

In another feature, the modulated signals include sub-carriers that are modulated using orthogonal frequency domain multiplexing (OFDM). Every $P^{th}$ one of the sub-carriers is modulated with a preamble symbol from one of the Y preamble sequences, where P is an integer greater than or equal to 1.

In another feature, every $P^{th}$ one of the sub-carriers has one of substantially the same channel phase and substantially the same differential channel phase.

In another feature, the differential demodulation means generates the differentially demodulated signals by multiplying a $Q^{th}$ one of the modulated signals by a complex conjugate of a $(Q+P)^{th}$ one of the modulated signals, where Q is an integer greater than or equal to 1.

In another feature, the states of the X symbols in the differentially demodulated signals are states of real parts of the differentially demodulated signals when imaginary parts of the differentially demodulated signals are approximately equal to zero.

In another feature, the states of the X predetermined symbols in the Y preamble sequences are generated by inverting states of derived symbols in derived preamble sequences that are derived from the Y preamble sequences, and wherein each of the Y preamble sequences is different from others of the Y preamble sequences.

In another feature, each of the derived symbols of one of the derived preamble sequences has a first binary value when a corresponding symbol and a symbol adjacent to the corresponding symbol in a corresponding one of the Y preamble sequences have opposite binary values, and the each of the derived symbols has a second binary value that is opposite to the first binary value when the corresponding symbol and the symbol adjacent to the corresponding symbol have the same binary value.

In another feature, the derived preamble sequences have a cross-correlation that is less than or equal to a predetermined cross-correlation threshold. The predetermined cross-correlation threshold is less than approximately 0.2 for an orthogonal frequency domain multiplexing (OFDM) system using a 1024 fast Fourier transform (FFT) mode.

In another feature, the summing means generates the cross-correlation values by adding the X sums generated for each of the Y preamble sequences.

In another feature, the cross-correlation means further comprises control means for communicating with the differential demodulation means and the summing means, selecting a largest one of the cross-correlation values, and detecting one of the Y preamble sequences in the modulated signals when the largest one of the cross-correlation values is greater than or equal to a predetermined threshold. The predetermined threshold is based on the signal strength of the modulated signals.

In another feature, the control means identifies a segment of a base station that transmitted the modulated signals based on the one of the Y preamble sequences detected in the modulated signals.

In another feature, the control means selects the largest one of the cross-correlation values based on the signal strength of the modulated signals.

In another feature, the system further comprises correlation means for communicating with the differential demodulation means and the control means and generating correlation values by correlating at least one of the differentially demodulated signals and at least one of derived preamble sequences that is derived from the Y preamble sequences. At least one of the derived preamble sequences generates at least two of the cross-correlation values that are greater than the predetermined threshold and that are substantially the same.

In another feature, the control means selects one of the correlation values having a largest real part, detects one of the Y preamble sequences in the modulated signals based on the largest real part, and identifies a segment of a base station that transmitted the modulated signals based on the one of the Y preamble sequences detected in the modulated signals.

In another feature, the control means selects one of the correlation values having a largest magnitude, detects one of the Y preamble sequences in the modulated signals based on the largest magnitude, and identifies a segment of a base station that transmitted the modulated signals based on the one of the Y preamble sequence detected in the modulated signals.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, the control means generates an estimate for an integer carrier frequency offset (CFO) present in the modulated signals when the control means selects the largest one of the cross-correlation values.

In another feature, a physical layer means (PHY) for communicating with a communication medium comprises the system and further comprises transceiver means for communicating with the differential demodulation means and receiving the differentially modulated signals.

In another feature, a network device comprises the PHY means and further comprises at least one antenna means for communicating with the transceiver means.

In still other features, a computer program executed by a processor comprises generating differentially demodulated signals by differentially demodulating modulated signals that include sub-carriers that are modulated using orthogonal frequency domain multiplexing (OFDM). The computer program further comprises generating cross-correlation values by cross-correlating states of X symbols in the differentially demodulated signals with corresponding states of X predetermined symbols in each of Y preamble sequences, where X is an integer greater than 1, and Y is an integer greater than 0. The computer program further comprises determining whether one of the Y preamble sequences is present in the modulated signals based on the cross-correlation values.

In another feature, the computer program further comprises detecting the states of the X symbols in the differentially demodulated signals, where each of the X symbols has one of a first state and a second state. The computer program further comprises generating X sums for each of the Y preamble sequences by adding each of the states of the X symbols with the corresponding states of the X predetermined symbols of each of the Y preamble sequences, where the X sums are modulo-2 sums.

In another feature, every $P^{th}$ one of the sub-carriers is modulated with a preamble symbol from one of the Y preamble sequences, where P is an integer greater than or equal to 1. Every $P^{th}$ one of the sub-carriers has one of substantially the same channel phase and substantially the same differential channel phase.

In another feature, the computer program further comprises generating the differentially demodulated signals by multiplying a $Q^{th}$ one of the modulated signals by a complex conjugate of a $(Q+P)^{th}$ one of the modulated signals, where Q is an integer greater than or equal to 1.

In another feature, the computer program further comprises determining the states of the X symbols in the differentially demodulated signals as states of real parts of the differentially demodulated signals when imaginary parts of the differentially demodulated signals are approximately equal to zero.

In another feature, the computer program further comprises generating the states of the X predetermined symbols in the Y preamble sequences by inverting states of derived symbols in derived preamble sequences that are derived from the Y preamble sequences.

In another feature, the computer program further comprises generating each of the derived symbols of one of the derived preamble sequences having a first binary value when a corresponding symbol and a symbol adjacent to the corresponding symbol in a corresponding one of the Y preamble sequences have opposite binary values, and having a second binary value that is opposite to the first binary value when the corresponding symbol and the symbol adjacent to the corresponding symbol have the same binary value.

In another feature, each of the Y preamble sequences is different from others of the Y preamble sequences, and wherein the derived preamble sequences have a cross-correlation that is less than or equal to a predetermined cross-correlation threshold. The predetermined cross-correlation threshold is less than approximately 0.2 for an orthogonal frequency domain multiplexing (OFDM) computer program using a 1024 fast Fourier transform (FFT) mode.

In another feature, the computer program further comprises generating the cross-correlation values by adding the X sums generated for each of the Y preamble sequences.

In another feature, the computer program further comprises selecting a largest one of the cross-correlation values and detecting one of the Y preamble sequences in the modulated signals when the largest one of the cross-correlation values is greater than or equal to a predetermined threshold. The predetermined threshold is based on the signal strength of the modulated signals.

In another feature, the computer program further comprises identifying a segment of a base station that transmitted the modulated signals based on the one of the Y preamble sequences detected in the modulated signals.

In another feature, the computer program further comprises selecting the largest one of the cross-correlation values based on the signal strength of the modulated signals.

In another feature, the computer program further comprises generating correlation values by correlating at least one of the differentially demodulated signals and at least one of derived preamble sequences that is derived from the Y preamble sequences. At least one of derived preamble sequences generates at least two of the cross-correlation values that are greater than the predetermined threshold and that are substantially the same.

In another feature, the computer program further comprises selecting one of the correlation values having a largest real part, detecting one of the Y preamble sequences in the modulated signals based on the largest real part, and identifying a segment of a base station that transmitted the modulated signals based on the one of the Y preamble sequences detected in the modulated signals.

In another feature, the computer program further comprises selecting one of the correlation values having a largest magnitude, detecting one of the Y preamble sequences in the modulated signals based on the largest magnitude, and identifying a segment of a base station that transmitted the modulated signals based on the one of the Y preamble sequence detected in the modulated signals.

In another feature, the modulated signals include a fractional carrier frequency offset (CFO) that generates a phase error that is substantially the same in each one of the modulated signals.

In another feature, the modulated signals include an integer carrier frequency offset (CFO) that generates a phase error that is substantially the same in each one of the modulated signals.

In another feature, the computer program further comprises generating an estimate for an integer carrier frequency offset (CFO) present in the modulated signals when selecting the largest one of the cross-correlation values.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table showing preamble sequences used by base stations of FIG. 3 to transmit data;

DETAILED DESCRIPTION

Figure 1:
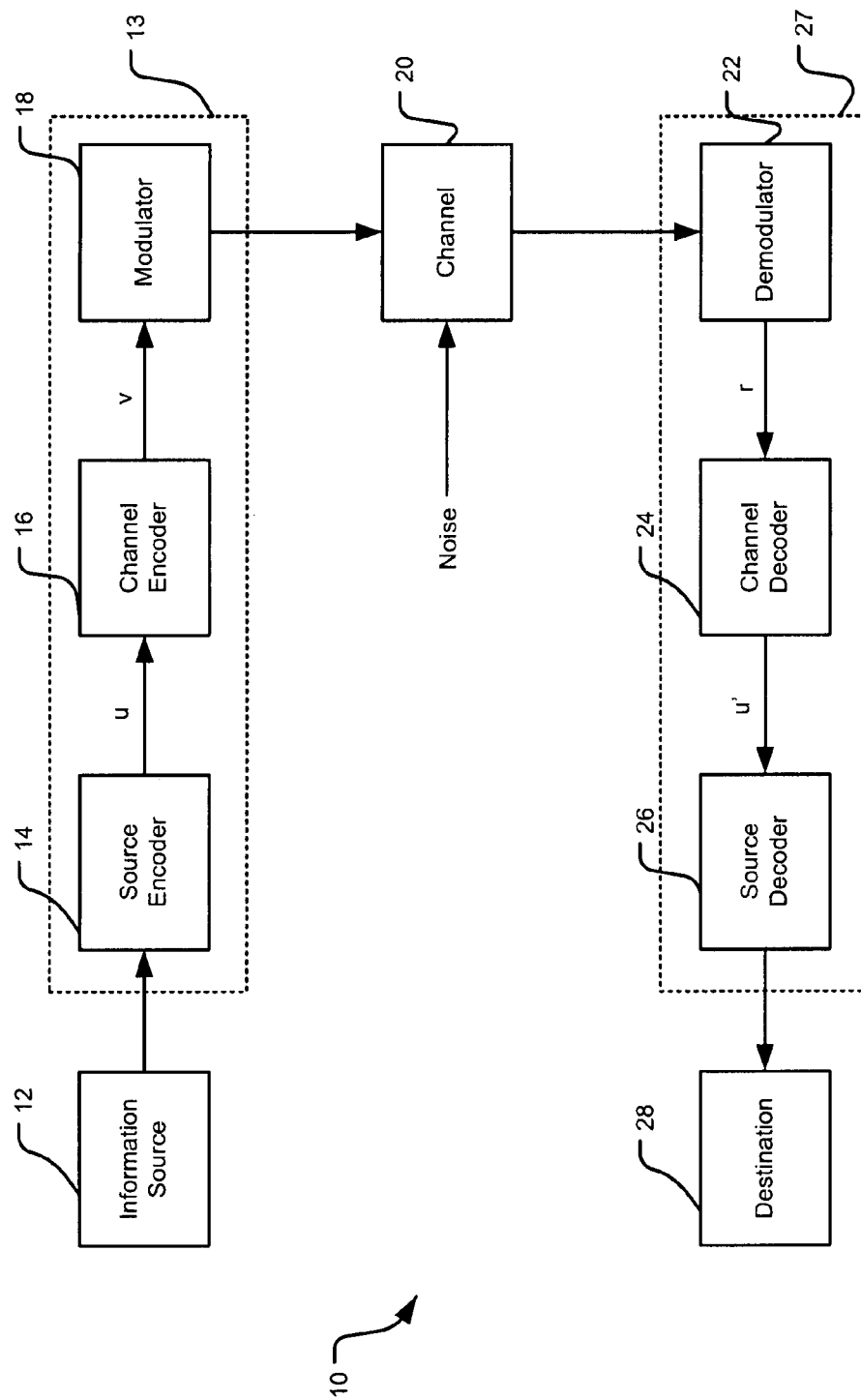
FIG. 1 is a functional block diagram of an exemplary communication system according to the prior art.
Figure 2A:
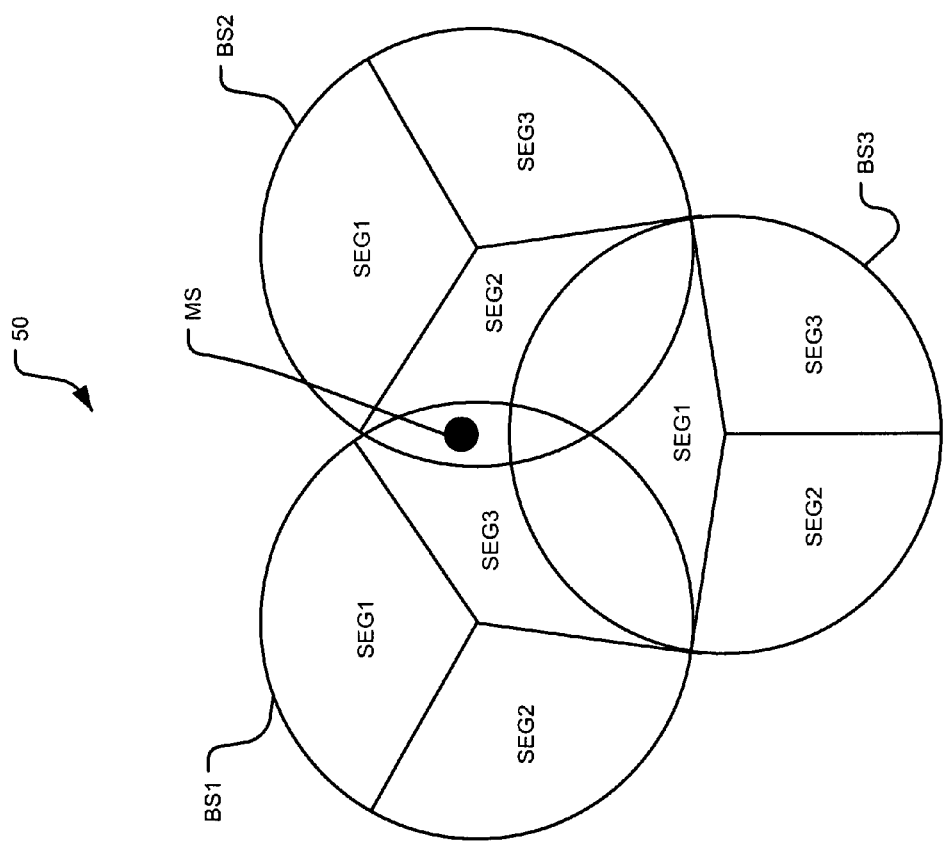
FIG. 2A is a schematic representation of an exemplary wireless communication system comprising three base stations and a mobile station according to the prior art.
Figure 2B:
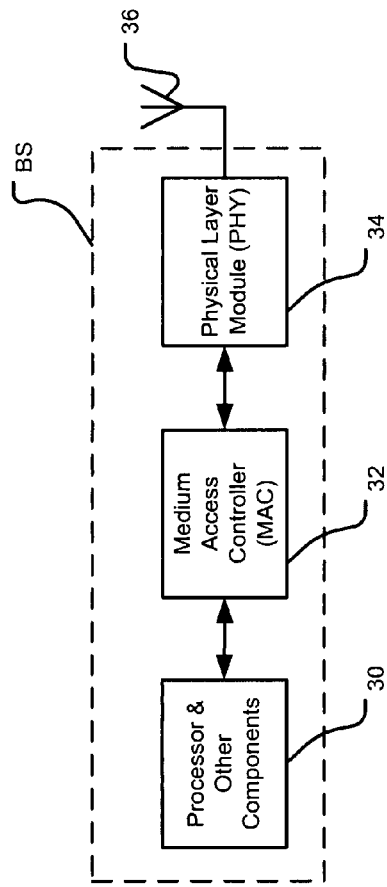
FIG. 2B is a functional block diagram of an exemplary base station utilized in the system of FIG. 2A.
Figure 2C:
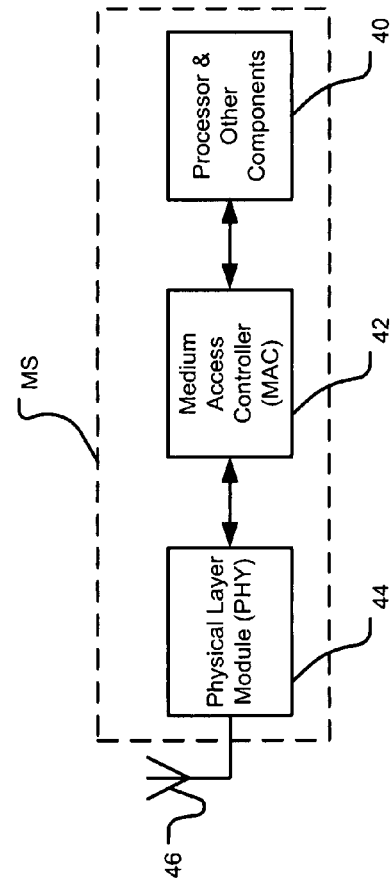
FIG. 2C is a functional block diagram of an exemplary mobile station utilized in the system of FIG. 2A.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
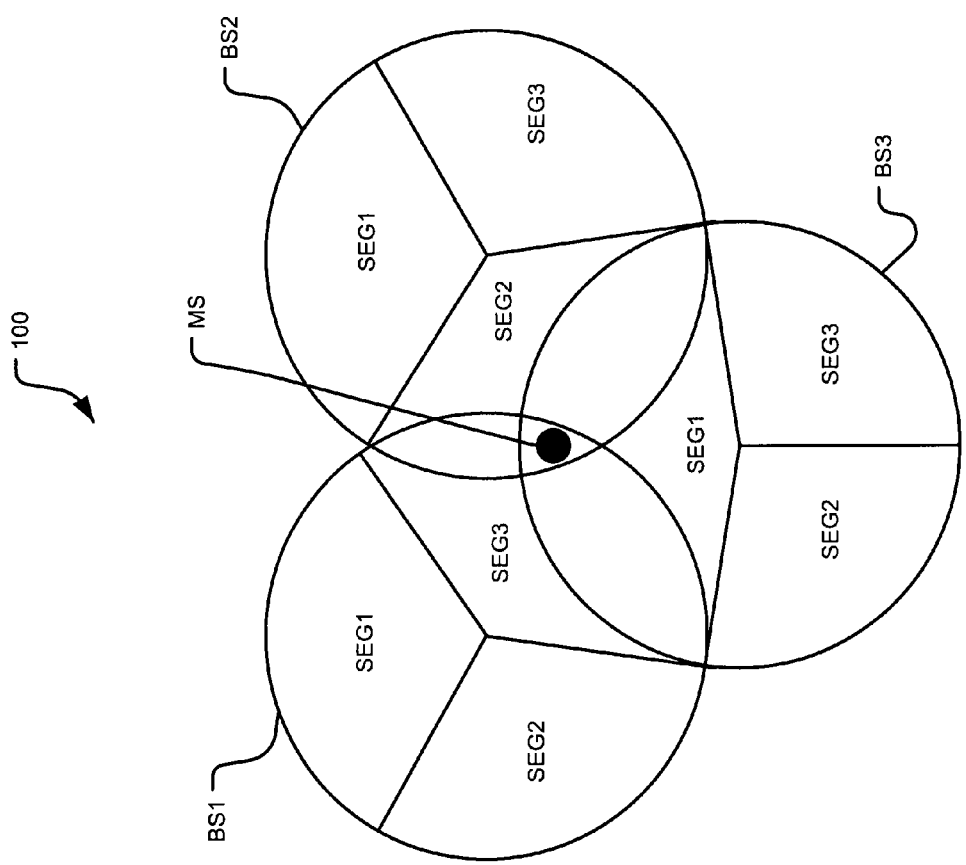
FIG. 3 is a schematic representation of an exemplary wireless communication system comprising three base stations and a mobile station.

Referring now to FIG. 3, a wireless communication system 100 may comprise base stations BS1, BS2, and BS3 (collectively BS) and one or more mobile stations (MS). Generally, one MS may communicate with up to three adjacent base stations. Each BS may transmit data that is modulated using an orthogonal frequency division multiplexing access (OFDMA) system.

Specifically, each BS may transmit data in three segments: SEG1, SEG2, and SEG3. The MS, which may move relative to each BS, may receive data from one or more base stations depending on the location of the MS relative to each BS. For example, the MS may receive data from SEG 3 of BS1, SEG 2 of BS2, and/or SEG 1 of BS3 when the MS is located as shown.

When a receiver in the MS is turned on (i.e., when the MS is powered up), the MS may associate with an appropriate segment of a corresponding BS depending on the location of the MS. The MS, however, can process data in a frame transmitted by a BS only if the MS can correctly detect a preamble sequence in the frame. Specifically, the MS can perform frame synchronization and retrieval of a cell ID (IDcell) and a segment number of the BS from the frame if the MS can detect the preamble sequence in the frame.

Referring now to FIG. 4, OFDMA systems may use 1024 and 512 sub-carriers to modulate and transmit data. OFDMA systems using 1024 and 512 sub-carriers are generally referred to as OFDMA systems having 1024 and 512 FFT modes, respectively. Additionally, I.E.E.E. 802.16e supports 128 FFT and 2048 FFT modes.

A total of 114 preamble sequences exist for OFDMA systems that use fast Fourier transforms (FFT) to modulate 1024 and 512 sub-carriers. Each preamble sequence is unique. That is, each preamble sequence is distinct from another preamble sequence and is identified by an index number. The index number may be referred to as preamble sequence index. Each preamble sequence is 284 and 143 bits (symbols) long for 1024 and 512 FFT modes, respectively.

Since one MS may typically communicate with up to three base stations, each BS modulates every third sub-carrier. That is, each BS modulates one of every three sub-carriers. Additionally, each BS uses only one bit of the total bits in a preamble sequence when modulating every third sub-carrier. For example, in 1024 FFT mode, the BS may use bit numbers 1, 2, 3, . . . , etc., of the 284 bits in a preamble sequence to modulate sub-carrier numbers 1, 4, 7, . . . , etc., of the 1024 sub-carriers, respectively.

Each BS may use the same set of sub-carriers. Each segment in a BS, however, uses distinct sub-carriers at least for preamble purposes. For example, for each BS, segment 1 (SEG1) may use sub-carriers 0, 3, 6, 9, . . . , etc.; segment 2 (SEG2) may use sub-carriers 1, 4, 7, 10, . . . , etc.; and segment 3 (SEG3) may use sub-carriers 2, 5, 8, 11, . . . , etc.

Consequently, the MS receives distinct signals from each BS. For example, the MS may receive signals from SEG2 of BS2 on sub-carriers 1, 4, 7, 10, . . . , etc., from SEG1 of BS3 on sub-carriers 0, 3, 6, 9, . . . , etc., and from SEG 3 of BS1 on sub-carriers 2, 5, 8, 11, . . . , etc. Thus, the signals received by the MS may not interfere with each other since their sub-carriers are distinct.

A set of sub-carriers for segment n may be mathematically expressed as follows.

$$PreambleGarrierSet_n = n + 3k$$

where $0 \leq k \leq 283$ for 1024 FFT mode and $0 \leq k \leq 142$ for 512 FFT mode. Additionally, there may be 86 guard sub-carriers on the left and right ends of the spectrum in 1024 FFT mode. In the 512 FFT mode, there may be 42 guard sub-carriers on the left end and 41 guard sub-carriers on the right end.

Typically, when the receiver in the MS is turned on, the MS initially performs symbol timing and carrier frequency synchronization before the MS can detect a preamble sequence. The MS may perform these tasks using a cyclic prefix in the data frame. Thereafter, the MS determines whether a first symbol in the frame is a preamble symbol. If the first symbol is a preamble symbol, then the MS determines which preamble sequence is present in the frame. Once the MS determines the preamble sequence, the MS can associate with a corresponding segment of an appropriate BS.

Symbols in preamble sequences (i.e., preamble symbols) typically have higher energy than data symbols. For example, the energy of the preamble symbols is typically 8/3 times (i.e., 4.26 dB higher than) the energy of data symbols. This is useful in distinguishing preamble symbols from data symbols.

Additionally, the preamble sequences are almost orthogonal. That is, a cross-correlation between any two preamble sequences is very small. For example, the cross-correlation is typically less than 0.2. This is useful in distinguishing individual preamble sequences from one another. As shown in the table in FIG. 4, if the MS detects a preamble sequence having an index 0, then the MS associates with segment 0 of BS having cell ID 0, and so on.

Figure 5A:
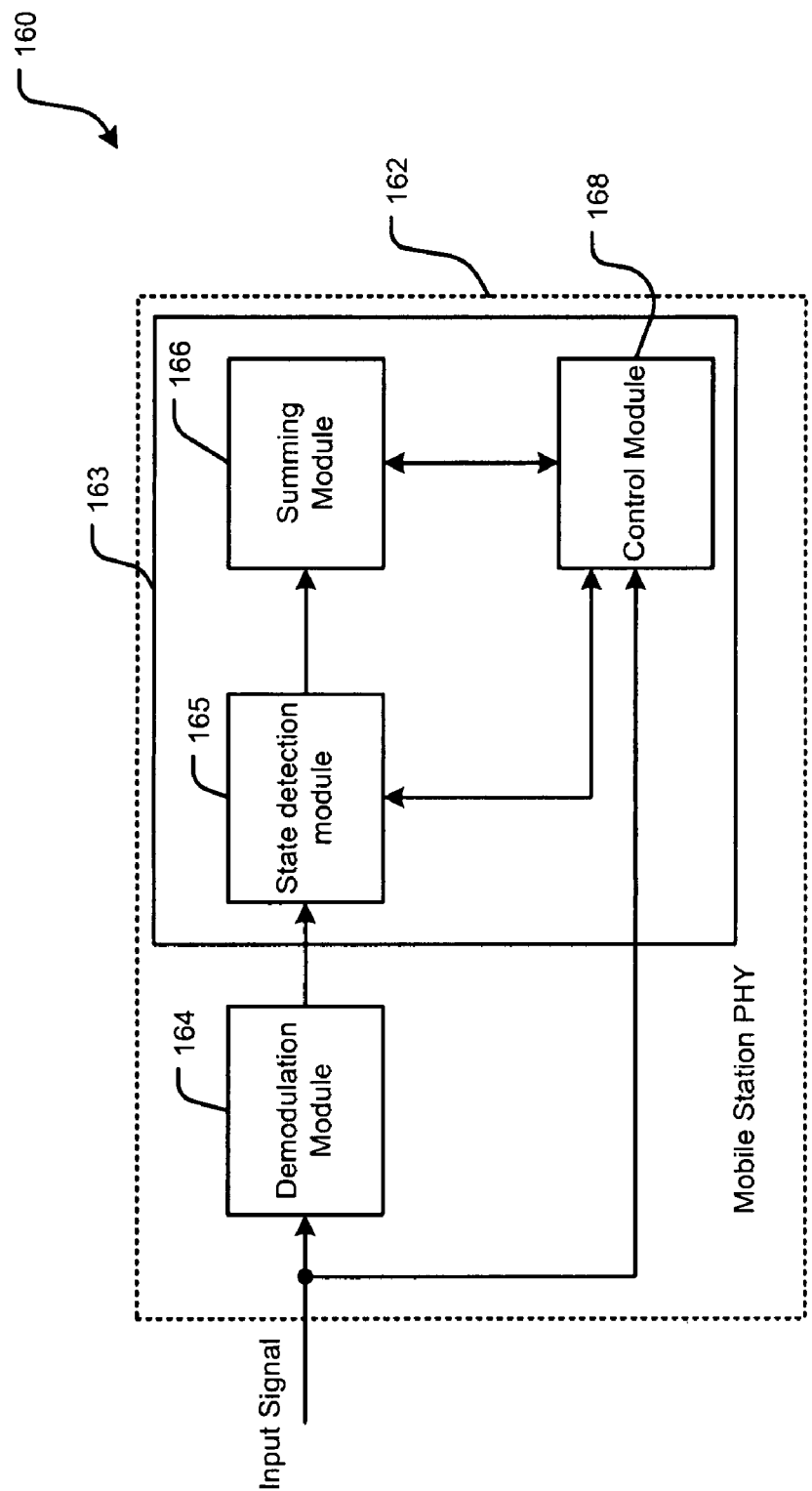
FIG. 5A is a functional block diagram of an exemplary preamble detection system according to the present disclosure.
Figure 5B:
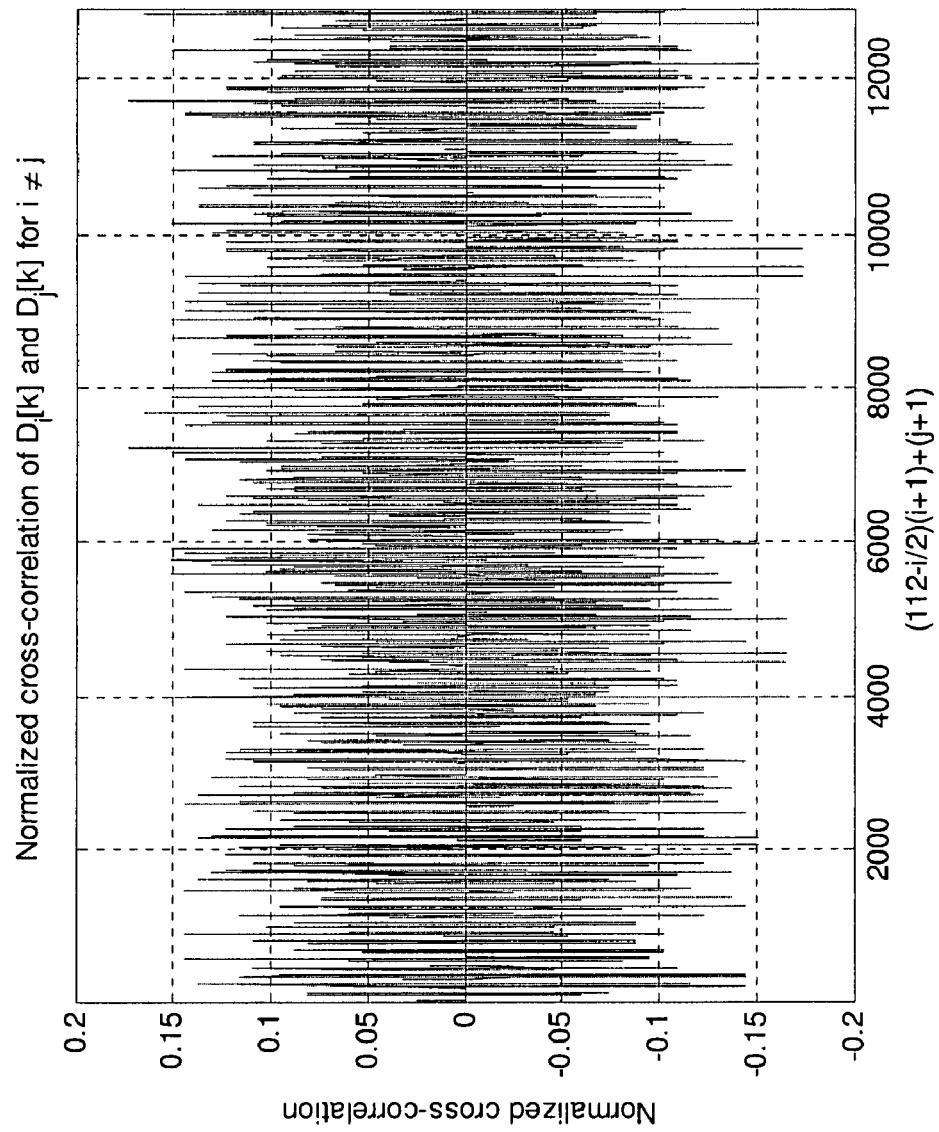
FIG. 5B is a graph showing normalized cross-correlation between preamble sequences derived from the preamble sequences shown in FIG. 4.

Referring now to FIGS. 5A-5D, a system 160 for detecting a preamble sequence in a mobile station (MS) may be implemented in a physical layer (PHY) module 162 of the MS. The system 160 shown in FIG. 5A comprises a differential demodulation module 164 and a cross-correlation module 163. The cross-correlation module 163 comprises a state detection module 165, a summing module 166, and a control module 168 as shown in FIG. 5A. The differential demodulation module 164 receives an input signal transmitted by a base station (BS). The input signal may be mathematically expressed as follows.

$$Y[k] = H[k]X_i[k] + Z[k]$$

where k is sub-carrier index, i is preamble sequence index, Y[k] is received input signal, H[k] is channel gain, $X_i[k]$ is transmit signal, and Z[k] is noise.

When a preamble bit (i.e., a preamble symbol) in a preamble sequence is a binary 0, the corresponding transmit signal $X_i[k]$ is +1 or positive. When a preamble bit in a preamble sequence is a binary 1, the corresponding transmit signal $X_i[k]$ is −1 or negative. That is, when a preamble bit in a preamble sequence is a 1, the channel phase of the sub-carrier in the transmit signal $X_i[k]$ is shifted by $\pi$ relative to the channel phase of the sub-carrier when a preamble bit in a preamble sequence is 0.

Adjacent modulated sub-carriers (i.e., sub-carriers 1, 4, 7, etc.) may have similar channel phase or an unknown differential channel phase that is common to all k sub-carriers. The unknown differential channel phase may be caused by presence of a symbol timing offset, which in turn may be caused by improper symbol timing synchronization. When adjacent modulated sub-carriers have similar channel phase, the channel phase difference between adjacent modulated sub-carriers is nearly zero.

On the other hand, when adjacent modulated sub-carriers have an unknown differential channel phase that is common to all k sub-carriers, the channel phase difference between adjacent modulated sub-carriers may be non-zero. When adjacent modulated sub-carriers have similar channel phase or unknown differential channel phase common to all sub-carriers, the sub-carriers are generally referred to as "moderately frequency selective channels."

The differential demodulation module 164 performs a differential demodulation operation on the input signal and generates a differentially demodulated signal. Specifically, the differential demodulation module 164 multiplies a modulated sub-carrier by a complex conjugate of an adjacent modulated sub-carrier located three sub-carriers apart.

When the adjacent modulated sub-carriers have similar channel phase, the differentially demodulated signal can be mathematically expressed as follows.

$$M[k]=Y^*[k-3]Y[k]=H[k]H^*[k-3]D_i[k]+\tilde{Z}[k]\approx|H[k]H^*[k-3]|D_i[k]+\tilde{Z}[k]$$

where $Y^*[k-3]$ denotes a complex conjugate of a modulated sub-carrier that is three sub-carriers apart from the modulated sub-carrier $Y[k]$. The complex conjugate is indicated by asterisk or "*". Since the adjacent modulated sub-carriers have similar channel phase, the channel phase difference between the adjacent modulated sub-carriers is nearly zero. That is, $$\angle(H[k]H^*[k-3])\approx 0$$

The control module 168 may store XOR'ed versions of preamble sequences in memory. XOR'ed versions of preamble sequences may also be referred to as derived preamble sequences. An XOR'ed or derived preamble sequence is generated by XORing adjacent bits in the preamble sequence. For example, if one of the 114 preamble sequences in 1024 FFT mode includes bits B1, B2, B3, . . . , B284, then an XOR'ed version of that preamble sequence includes bits X1, X2, X3, . . . , X284, where X1=B1⊕B2, X2=B2⊕B3, etc., where ⊕ denotes an XOR operation. The derived preamble sequences may be mathematically expressed as follows.

$$D_i[k]=X_i[k]X_i^*[k-3]$$

where the asterisk (i.e., "*") denotes a complex conjugate. Actually performing complex conjugate operations to generate complex conjugates, however, is unnecessary since complex conjugates of 1 and −1 are 1 and −1, respectively. That is, $1^*=1$, and $(-1)^*=-1$.

A cross-correlation between the derived preamble sequences is given by the following formula.

$$\max_{i,j\neq i}\left\{\frac{\sum_{k\in P_{s(i)}}D_i[k]D_j^*[k]}{\sum_{k\in P_{s(i)}}|D_i[k]|^2}\right\}\approx 0.1731 \text{ for } 1024 \; FFT$$

where Ps=set of pilot sub-carriers for segment s except left most pilot sub-carrier, and s(i)=segment number for a preamble sequence index i. FIG. 6B shows cross-correlation values normalized by $$\sum_{k\in P_{s(0)}}|D_0[k]|^2$$

for 1024 FFT mode.

For moderately frequency selective channels with high signal-to-noise ratio (SNR), the noise may be very low. That is, $$\tilde{Z}[k]<<|H[k]H^*[k-3]|D_i[k]$$

Disregarding the noise, the differentially demodulated signal M[k] may be represented by the following equation.

$$M[k]=H[k]H^*[k-3]D_i[k]+\tilde{Z}[k]\approx|H[k]H^*[k-3]|D_i[k]$$

The sign of the real part of M[k] is the same as the sign of $D_i[k]$ in absence of noise and when $\angle(H[k]H^*[k-3])\approx 0$. That is, when $D_i[k]=1$, M[k] is positive or +1, and when $D_i[k]=0$, M[k] is negative or −1. This may be mathematically expressed as follows.

$$u(Re\{M[k]\})=u(Re\{D_i[k]\})$$

where u represents the sign and Re{M[k]} and Re{$D_i$[k]} represent real parts of M[k] and $D_i$[k], respectively. Thus, $$u(x)=\begin{cases}1 & \text{for } x\geq 0\\ 0 & \text{for } x<0\end{cases}$$

That is, positive values of real part (e.g., x=+1) represent binary 1s, and negative values of real part (e.g., x=−1) represent binary 0s. Hereinafter, the word "sign" may be used interchangeably with (i.e., synonymously as) "state" and/or "polarity."

Signs or states of M[k] and $D_i$[k] may be used to simplify implementation of preamble detection as follows. Instead of performing a complex operation of calculating correlation values between M[k] and $D_i$[k], a preamble sequence may be detected by performing XOR operations on (i.e., modulo 2 sums of) signs or states of real parts of M[k] and $D_i$[k]. The XOR operations generate values that are equivalent to correlation values that may be generated by performing correlation of M[k] and $D_i$[k] using a correlation module.

Since XOR operations are simpler to implement than implementing correlation operations, the XOR operations will be hereinafter referred to as low-complexity cross-correlation. Consequently, values generated by the XOR operations will be hereinafter referred to as low-complexity cross-correlation values or cross-correlation values.

The state detection module 165 detects the state or sign of M[k]. The summing module 166 generates the cross-correlation values for each preamble sequence as follows.

$$\tilde{C}_j = \sum_{k \in P_{s(i)}} u(\text{Re}\{M[k]\}) \oplus (1 - u(D_j[k]))$$

where Ps=set of pilot sub-carriers for segment s except left most pilot sub-carrier, and s(j)=segment number for a preamble sequence index j. u(Re{M[k]}) is the sign or state of the real part of M[k], and u($D_j$[k]) are the signs or states of the derived preamble sequences. Since the states of M[k] and $D_j$[k] are identical, the XOR of states of M[k] and $D_j$[k] would be zero. Therefore, instead of using states of ($D_j$[k]), the summing module 166 uses states (1−u($D_j$[k])), which are opposite of states of ($D_j$[k]). That is, (1−u($D_j$[k])) is essentially the same as inverted u($D_j$[k]).

For example, if sequence $D_j$[k] is 10110, then (1−u($D_j$[k])) is 01001. Thus, if received sequence in M[k] is the same as the transmitted sequence, the value of the sum $C_j$ (i.e., the cross-correlation value) would be 5. On the other hand, if the received sequence is different from 10110, the value of the sum $C_j$ would be less than 5. Stated generally, the cross-correlation value will be largest when a received sequence in the differentially demodulated signal M[k] matches one of differentially demodulated preamble sequences $D_j$[k].

For simplicity, (1−u($D_i$[k])) may be hereinafter referred to as predetermined states of preamble sequences. The control module 168 may store the states (1−u($D_i$[k])) for all preamble sequences. Thus, the state detection module 165 does not have to detect the predetermined states of preamble sequences, and the summing module 166 may read the predetermined states of preamble sequences directly from the control module 168 when performing cross-correlation.

The control module 168 estimates a preamble sequence index i from the cross-correlation values generated by the summing module 166 as follows. The control module 168 selects the preamble sequence index for which the cross-correlation value with the differentially demodulated signal is largest. This may be mathematically expressed as follows.

$$\hat{i} = \arg\max_j \{\tilde{C}_j\}$$

The control module 168 determines that a preamble sequence is detected if the magnitude of the largest cross-correlation value is greater than or equal to a predetermined threshold. The predetermined threshold may be based on the strength of the input signal.

Although the system 160 utilizes low-complexity cross-correlation by performing XOR operations instead of actual correlation operations to detect a preamble sequence, the system 160 may reliably detect the preamble sequence. That is, the system 160 may not mis-detect or fail to detect a preamble sequence. This is because of two reasons: First, the pilot sub-carriers for preamble sequences have higher SNRs than regular data sub-carriers since the pilot sub-carriers have approximately 9 dB higher energy than regular data sub-carriers. This helps in distinguishing a preamble symbol from a data symbol and detecting the preamble symbol thereby reducing probability of mis-detection or detection failure.

Second, the preamble sequences have high redundancy, which may help in increasing the accuracy with which preamble sequences may be detected despite using XOR operations instead of actual correlation operations. Specifically, in 1024 FFT mode, less than 7 bits would be sufficient to represent 144 preamble sequences ($2^7$=128, which is more than 114). Yet each preamble sequence is 284-bits long wherein 7 bits are encoded to 284 bits thereby leaving many bits redundant.

The control module 168 determines which segment transmitted the detected preamble sequence implicitly when the control module 168 detects the preamble sequence. This is because each preamble sequence is unique as identified by a unique preamble sequence index number, and each segment transmits a unique preamble sequence using distinct sub-carriers.

Thus, when the control module 168 detects the preamble sequence by selecting the largest cross-correlation value, the control module 168 implicitly selects the segment having the largest channel gain (i.e., the best segment). Thus, when the control module 168 detects the preamble sequence, the control module 168 implicitly detects which segment transmitted the preamble sequence.

Occasionally, two or more preamble sequences may generate cross-correlation values that are larger than the rest and approximately the same. For example, when a mobile station is adjacent to a cell boundary or a segment boundary, the mobile station may receive signals including preamble sequences from adjacent base stations.

The input signal received by the mobile station at cell or segment boundaries may be a sum of up to three signals that may be transmitted by three different segments of three different base stations. This is mathematically expressed as follows.

$$Y[k] = \sum_{s=0}^{2} H[k,s] X_{i(s)}[k] + Z[k]$$

where
i(s)=preamble sequence index used for segment s,
H[k,s]=preamble OFDMA symbol of segment s, and
$X_{i(s)}$[k]=channel gain corresponding to the segment s.

In that case, the summing module 166 may generate cross-correlation values that are similar and larger that the rest due to the presence of two or more preamble sequences in the received signals. Subsequently, the control module 168 may detect two or more cross-correlation values that are similar and that are larger than the rest of the cross-correlation values.

Consequently, when using low-complexity cross-correlation, the best segment determined by the control module 168 may or may not in fact be the best segment depending on the channel gain and noise. For example, when channel gain H[k] is very high, say 10, and noise Z[k] is very low, say 0.1, the probability may be very high that the sign of Y[k] may be positive for a binary 0 and negative for a binary 1. In that case, the best segment determined by the control module 168 may in fact be the best segment.

On the other hand, when H[k] is very low, say only 1, the signs of Y[k] may still be positive and negative for 0s and 1s, respectively. However, when the channel gain is very low and the noise level is high, the signs of Y[k] may not be positive and negative for 1s and 0s, respectively. That is, high noise levels may invert the sign of Y[k] when channel gain is very low. Sign inversions due to low channel gain and/or high noise may affect the ability of the control module 168 to accurately select the segment since the low-complexity cross-correlation is based on signs of M[k] and D[k].

When two or more cross-correlation values are similar and larger than the rest, the control module 168 may select the correct segment in three ways. In one way, the control module

168 may randomly select one of the two or more cross-correlation values. Thus, the control module 168 selects the segment that corresponds to the preamble sequence that yielded the randomly selected largest cross-correlation value.

In another way, the control module 168 may select one of the two or more larger cross-correlation values based on the strength of the input signal. That is, the control module 168 may select the larger cross-correlation value that corresponds to the strongest input signal. This may be mathematically expressed as follows.

$$\hat{s} = \arg\max_{s}\left\{\sum_{k\in P_s}|Y[k]|\right\}$$

The control module 168 may accurately select the segment based on input signal strength when the noise level is approximately the same for all input signals received from different segments.

Figure 5C:
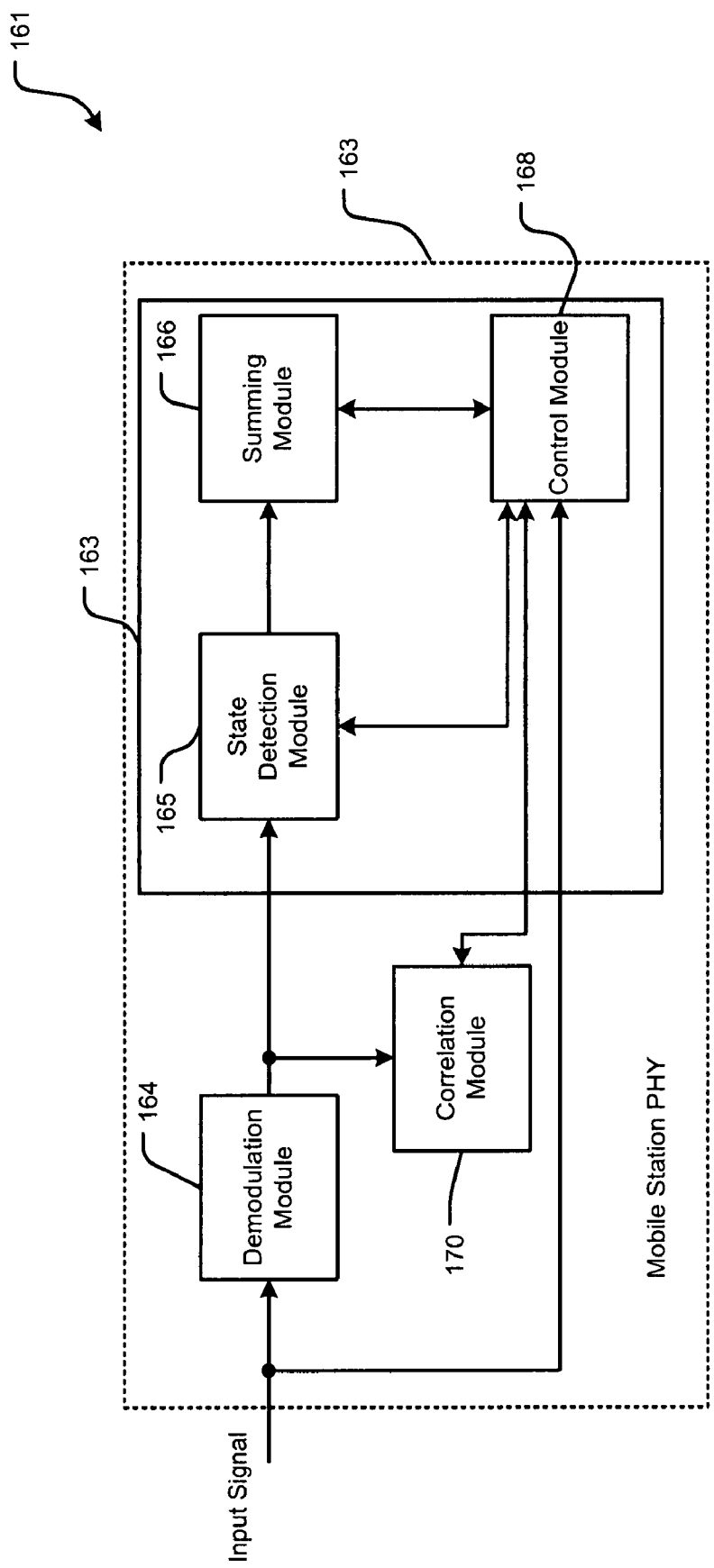
FIG. 5C is a functional block diagram of an exemplary segment selection system according to the present disclosure.

In yet another way, the system 160 may include a correlation module 170 that correlates the differentially demodulated input signals and the derived preamble sequences that generated the two or more larger and similar cross-correlation values. An example of such a system 161 implemented in a PHY module 163 of a mobile station is shown in FIG. 5C. Hereinafter, the differentially demodulated input signals and the derived preamble sequences that generated the two or more larger and similar cross-correlation values will be called selected input signals and selected preamble sequences, respectively.

The correlation module 170 correlates the selected input signals with the selected preamble sequences, generates correlation values, and outputs the correlation values to the control module 168. The correlation values are complex numbers, which have real and imaginary parts. The imaginary parts of the correlation values represent noise in the input signal.

When $\angle(H[k]H^*[k-3])\approx 0$, i.e., when adjacent modulated sub-carriers have similar channel phase, the control module 168 disregards the imaginary parts and selects a correlation value having a largest real part. The control module 168 selects the segment that corresponds to the preamble sequence that generated the correlation value having the largest real part.

On the other hand, when the adjacent modulated sub-carriers have an unknown differential channel phase θ common to all k sub-carriers, the control module 168 calculates the magnitude of the largest correlation value instead of selecting the real part of the largest correlation value. That is, the control module 168 does not disregard the imaginary part of the largest correlation value. The control module 168 selects the segment that corresponds to the preamble sequence that generated the correlation value having the largest magnitude.

Occasionally, the input signal may comprise a carrier frequency offset (CFO). The CFO may be fractional or integer. An input signal comprising fractional CFO may be mathematically expressed as follows.

$$Y[k]=C(\epsilon,0)H[k]X[k]+I(\epsilon,k)+Z[k]$$

where $\epsilon=\Delta fNT$ represents normalized CFO. Fractional CFO introduces Inter-carrier interference (ICI) as given by the following equation.

$$I(\varepsilon, k) = \sum_{r=1}^{N-1} C(\varepsilon, r)H[((k-r))_N]X[((k-r))_N]$$

where N=total number of sub-carriers in an FFT mode, and $$C(\varepsilon, r) = \frac{\sin(\pi(\varepsilon-r))}{N\sin(\pi(\varepsilon-r)/N)} e^{j\pi(\varepsilon-r)(1-1/N)}$$

Additionally, the fractional CFO decreases signal to noise ratio (SNR) of the input signal. This is mathematically expressed as follows.

$$E[SNR(\varepsilon, k)] \approx \frac{|C(\varepsilon, 0)|^2 SNR_0}{(1-|C(\varepsilon, 0)|^2)SNR_0 + 1}$$

where $SNR_0$ represents average SNR in absence of CFO. SNR decreases as CFO increases.

Since fractional CFO introduces ICI and attenuates the input signal, the fractional CFO adversely affects preamble sequence detection in system 150. The fractional CFO, however, does not affect the preamble sequence detection significantly. This is because the fractional CFO adds a phase error that is common to all sub-carriers, which does not change the frequency selectivity of the channels.

On the other hand, when the CFO is an integer 1, a phase error θ introduced by the integer CFO may be common to all k sub-carriers. In that case, the input signal may be mathematically expressed as follows.

$$Y[k]=e^{j\theta}H[((k-l))_N]X_i[((k-l))_N]+Z[((k-l))_N]$$

Specifically, the integer CFO causes a cyclic shift of the input signal in the frequency domain. In other words, the integer CFO rotates the input signal in the frequency domain. Thus, a transmitted sub-carrier k may be received as a sub-carrier (k−l). θ, however, cancels out since the differential demodulation module 164 generates M[k] by differentially demodulating Y[k].

The summing module 166 generates cross-correlation values using shifted version of input signals as given by the following equation.

$$\tilde{C}_{j,m} = \sum_{k\in P_{s(j)}} u(\text{Re}\{M[((k-m))_N]\}) \oplus (1-u(D_j[k]))$$

Subsequently, the control module 168 detects a preamble sequence by selecting a maximum among the cross-correlation values according to the following equation.

$$(\hat{i},\hat{l}) = \arg\max_{(j,m)}\{|C_{j,m}|\}$$

Figure 5D:
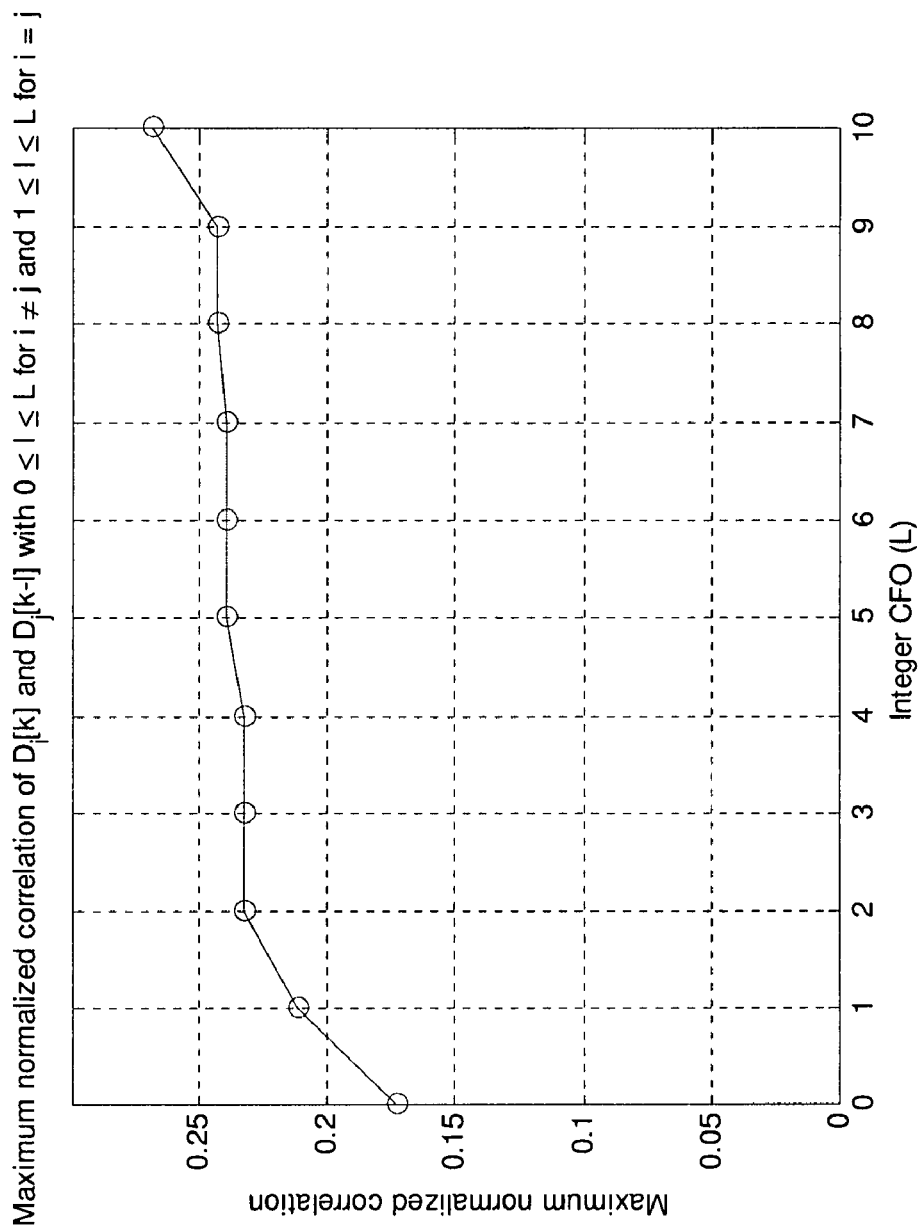
FIG. 5D is a graph showing effect of integer carrier frequency offset on normalized maximum cross-correlation according to the present disclosure.

Simultaneously, the control module 168 calculates î, which is an estimated value for the integer CFO. FIG. 5D shows maximum cross-correlation values normalized by $$\sum_{k \in P_{s(0)}} |D_0[k]|^2.$$

The maximum cross-correlation values increase, but not significantly, as integer CFO increases.

Occasionally, the input signal may have a small symbol timing offset due to improper symbol timing synchronization, which is performed when the MS is powered up. The symbol timing offset may cause inter-symbol interference (ISI). Additionally, the symbol timing offset may cause an inter-carrier interference (ICI). The input signal having a symbol timing offset can be mathematically expressed as follows.

$$Y[k] = \exp\left(\frac{j2\pi\tau k}{N}\right) H[k] X_i[k] + I(\tau, k) + Z[k]$$

where τ represents symbol timing offset and I(τ,k) represents ISI and ICI.

Specifically, the symbol timing offset introduces an extra phase offset among the sub-carriers. The phase offset may increase linearly as the sub-carrier index k increases. Additionally, the extra phase offset introduced by the symbol timing offset appears in the differentially demodulated signal generated by the differential demodulation module 164.

The differentially demodulated signal with the extra phase offset is mathematically expressed as follows.

$$M[k] = \exp\left(\frac{j6\pi\tau}{N}\right) H[k] H*[k-3] D_i[k] + Z'[k]$$

where 6π=2π*P (P=3 is the spacing between modulated sub-carriers). The accuracy with which the control module 168 detects a preamble sequence and selects a segment is inversely proportional to the linearly increasing phase offset.

Figure 6:
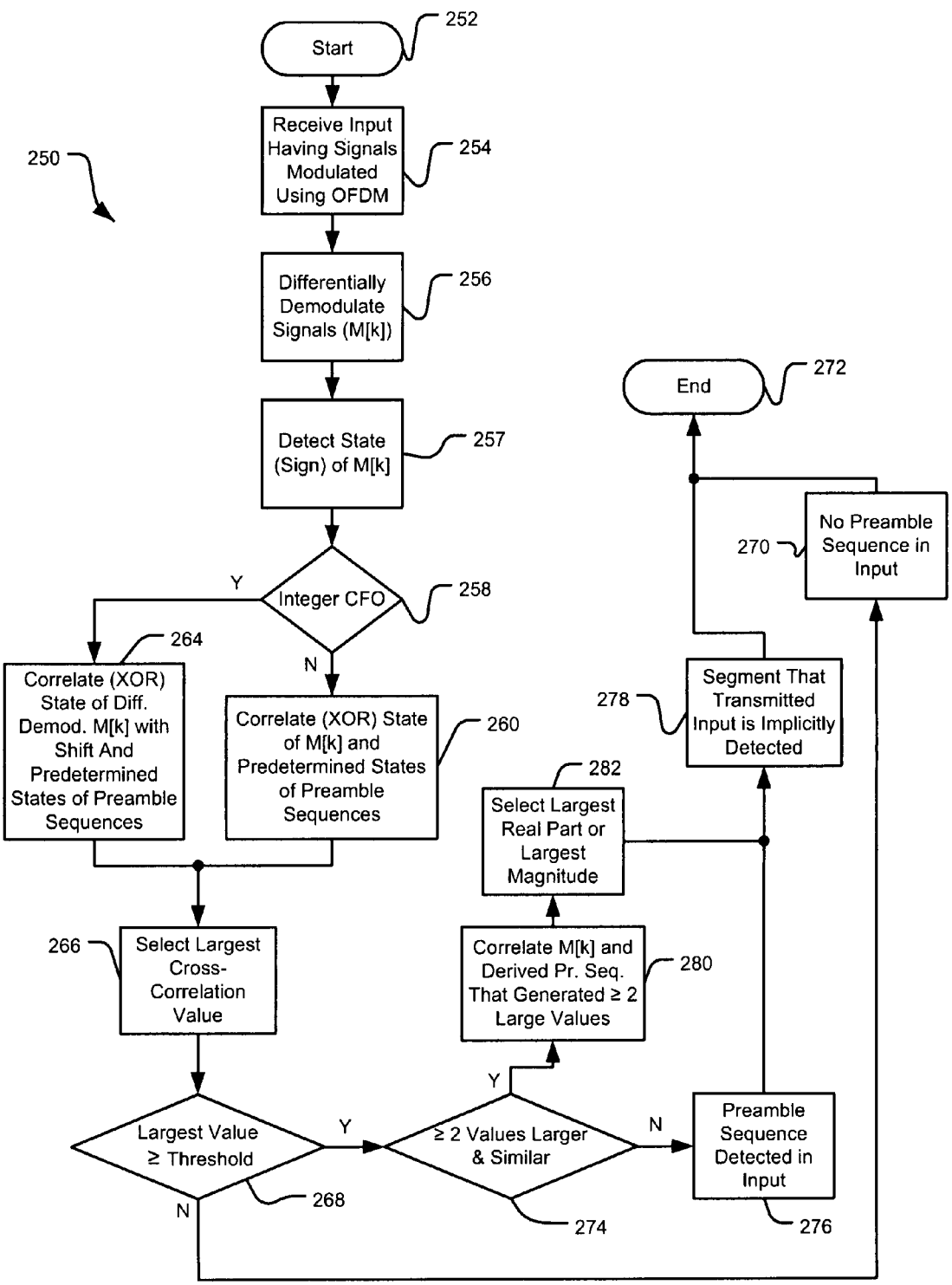
FIG. 6 is a flowchart of an exemplary method for preamble detection when sub-carriers have substantially similar channel phase.

Referring now to FIG. 6, a method 250 for detecting a preamble sequence when moderately frequency selective channels have substantially the same channel phase begins at step 252. A differential demodulation module 164 receives an input signal having signals modulated using orthogonal frequency division multiplexing (OFDM) in step 254. The differential demodulation module 164 differentially demodulates the signals in step 256. A state detection module 165 detects states (i.e., signs) of the differentially demodulated signals in step 257.

A control module 168 determines in step 258 if an integer carrier frequency offset (CFO) is present in the input signal. If the integer CFO is absent, a summing module 166 correlates (XORs) the states of differentially demodulated signals with predetermined states of preamble sequences in step 260. If the integer CFO is present, however, the summing module 166 correlates in step 264 the predetermined states of preamble sequences with the states of differentially demodulated signals that include the shift caused by the integer CFO.

The control module 168 selects in step 266 a largest cross-correlation value generated by the summing module 166. The control module 168 checks if the largest cross-correlation value is greater than or equal to a predetermined threshold in step 268. If false, the control module 168 determines in step 270 that no preamble sequence is detected in the input signal, and the method 250 ends in step 272.

If true, however, the control module 168 checks if two or more cross-correlation values are similar and larger than the rest in step 274. If false, the control module 168 determines that a preamble sequence is detected in the input signal in step 276. Since each preamble sequence is unique and since each segment of each base station transmits using distinct sub-carriers, the control module 168 implicitly determines in step 278 which segment of a base station transmitted the detected preamble sequence. The method 250 ends in step 272.

If the result of step 274 is true, then in step 280, a correlation module 170 correlates the differential input signals and the derived preamble sequences that generated the two or more similar and large cross-correlation values. In step 282, the control module 168 selects either the real part or the magnitude of the largest of the correlation values generated by the correlation module 170. The control module 168 implicitly determines in step 278 which segment of a base station transmitted the detected preamble sequence. The method 250 ends in step 272.

Figure 7B:
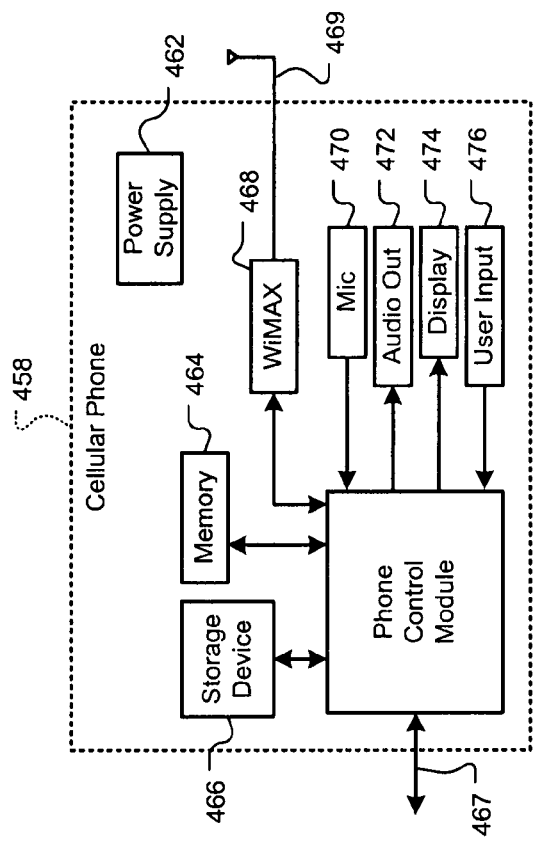
FIG. 7B is a functional block diagram of a cellular phone.
Figure 7A:
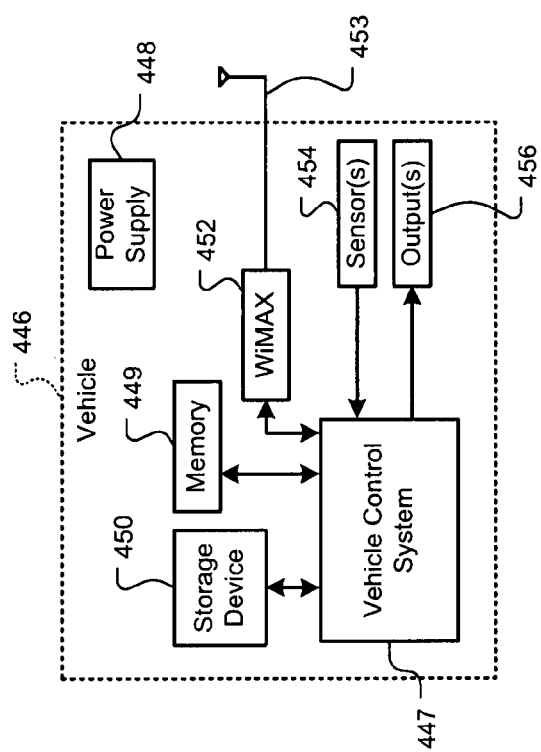
FIG. 7A is a functional block diagram of a vehicle control system.
Figure 7C:
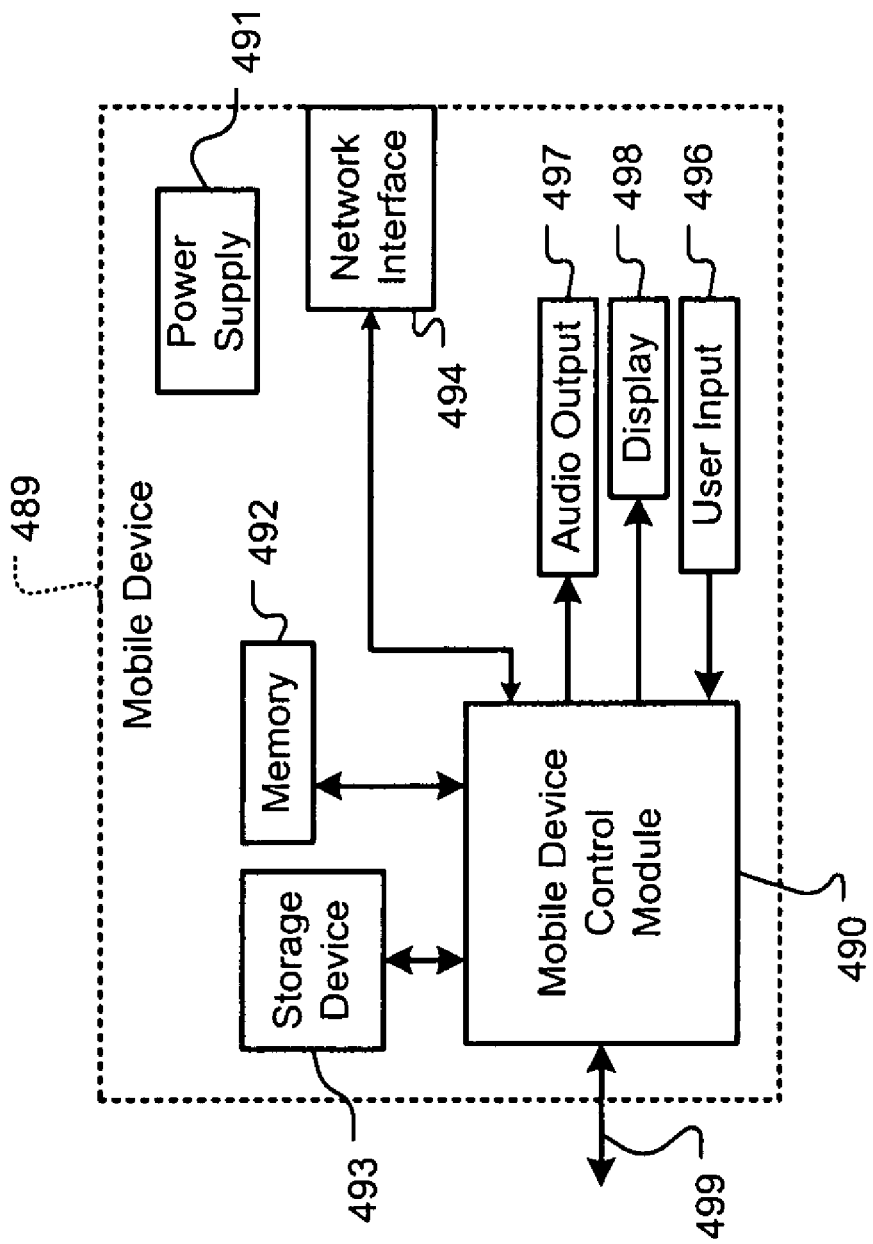
FIG. 7C is a functional block diagram of a mobile device.

Referring now to FIGS. 7A-7C, various exemplary implementations incorporating the teachings of the present disclosure are shown. For example, the teachings of the present disclosure may be implemented in communication systems based on WiMAX standards, which provide mobile wireless connectivity without the need for a direct line-of-sight with a base station.

Referring now to FIG. 7A, the teachings of the disclosure may be implemented in a WiMAX interface 452 of a vehicle 446. The vehicle 446 may include a vehicle control system 447, a power supply 448, memory 449, a storage device 450, and the WiMAX interface 452 and associated antenna 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or non-volatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WiMAX interface 452.

Referring now to FIG. 7B, the teachings of the disclosure can be implemented in a WiMAX interface 468 of a cellular phone 458. The cellular phone 458 includes a phone control module 460, a power supply 462, memory 464, a storage device 466, and a cellular network interface 467. The cellular phone 458 may include the WiMAX interface 468 and associated antenna 469, a microphone 470, an audio output 472 such as a speaker and/or output jack, a display 474, and a user input device 476 such as a keypad and/or pointing device.

The phone control module 460 may receive input signals from the cellular network interface 467, the WiMAX interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WiMAX interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 7C, the teachings of the disclosure can be implemented in a network interface 494 of a mobile device 489. The mobile device 489 may include a mobile device control module 490, a power supply 491, memory 492, a storage device 493, the network interface 494, and an external interface 499. The network interface 494 includes a WiMAX interface and an antenna (not shown).

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
   a differential demodulation module that (i) differentially demodulates modulated signals and (ii) generates corresponding differentially demodulated signals; and
   a cross-correlation module that
      receives said differentially demodulated signals,
      generates cross-correlation values by cross-correlating states of X symbols in said differentially demodulated signals with corresponding states of X predetermined symbols in each of Y preamble sequences, and
      determines whether one of said Y preamble sequences is present in said modulated signals based on said cross-correlation values, where X and Y are integers greater than 1, and
   wherein said cross-correlation module comprises:
      a state detection module that detects said states of said X symbols in said differentially demodulated signals, where each of said X symbols has one of a first state and a second state; and
      a summing module that (i) receives said Y preamble sequences and (ii) generates said cross-correlation values by generating X sums for each of said Y preamble sequences by adding each of said states of said X symbols with said corresponding states of said X predetermined symbols in each of said Y preamble sequences.

2. The system of claim 1 wherein said modulated signals include sub-carriers that are modulated using orthogonal frequency domain multiplexing (OFDM).

3. The system of claim 2 wherein every $P^{th}$ one of said sub-carriers is modulated with a preamble symbol from one of said Y preamble sequences, where P is an integer greater than or equal to 1.

4. The system of claim 3 wherein said every $P^{th}$ one of said sub-carriers has one of substantially the same channel phase and substantially the same differential channel phase.

5. The system of claim 3 wherein said differential demodulation module generates said differentially demodulated signals by multiplying a $Q^{th}$ one of said modulated signals by a complex conjugate of a $(Q+P)^{th}$ one of said modulated signals, where Q is an integer greater than or equal to 1.

6. The system of claim 1 wherein said states of said X symbols in said differentially demodulated signals are states of real parts of said differentially demodulated signals when imaginary parts of said differentially demodulated signals are approximately equal to zero.

7. The system of claim 1 wherein said states of said X sums are modulo-2 sums.

8. The system of claim 1 wherein said states of said X predetermined symbols in said Y preamble sequences are generated by inverting states of derived symbols in derived preamble sequences that are derived from said Y preamble sequences, and wherein each of said Y preamble sequences is different from others of said Y preamble sequences.

9. The system of claim 8 wherein each of said derived symbols of one of said derived preamble sequences has a first binary value when a corresponding symbol and a symbol adjacent to said corresponding symbol in a corresponding one of said Y preamble sequences have opposite binary values, and said each of said derived symbols has a second binary value that is opposite to said first binary value when said corresponding symbol and said symbol adjacent to said corresponding symbol have the same binary value.

10. The system of claim 8 wherein said derived preamble sequences have a cross-correlation that is less than or equal to a predetermined cross-correlation threshold.

11. The system of claim 10 wherein said predetermined cross-correlation threshold is less than approximately 0.2 for an orthogonal frequency domain multiplexing (OFDM) system using a 1024 fast Fourier transform (FFT) mode.

12. The system of claim 1 wherein said summing module generates said cross-correlation values by adding said X sums generated for each of said Y preamble sequences.

13. The system of claim 12 wherein said cross-correlation module further comprises a control module that communicates with said differential demodulation module and said summing module, that selects a largest one of said cross-correlation values, and that detects one of said Y preamble sequences in said modulated signals when said largest one of said cross-correlation values is greater than or equal to a predetermined threshold.

14. The system of claim 13 wherein said predetermined threshold is based on a signal strength of said modulated signals.

15. The system of claim 13 wherein said control module identifies a segment of a base station that transmitted said modulated signals based on said one of said Y preamble sequences detected in said modulated signals.

16. The system of claim 13 wherein said control module selects said largest one of said cross-correlation values based on a signal strength of said modulated signals.

17. The system of claim 13 further comprising a correlation module that communicates with said differential demodulation module and said control module and that generates correlation values by correlating at least one of said differentially demodulated signals and at least one of derived preamble sequences that is derived from said Y preamble sequences.

18. The system of claim 17 wherein said at least one of said derived preamble sequences generates at least two of said cross-correlation values that are greater than said predetermined threshold and that are substantially the same.

19. The system of claim 17 wherein said control module selects one of said correlation values having a largest real part, detects one of said Y preamble sequences in said modulated signals based on said largest real part, and identifies a segment of a base station that transmitted said modulated signals based on said one of said Y preamble sequences detected in said modulated signals.

20. The system of claim 17 wherein said control module selects one of said correlation values having a largest magnitude, detects one of said Y preamble sequences in said modulated signals based on said largest magnitude, and identifies a segment of a base station that transmitted said modulated signals based on said one of said Y preamble sequence detected in said modulated signals.

21. The system of claim 13 wherein said control module generates an estimate for an integer carrier frequency offset (CFO) present in said modulated signals when said control module selects said largest one of said cross-correlation values.

22. The system of claim 1 wherein said modulated signals include a fractional carrier frequency offset (CFO) that generates a phase error that is substantially the same in each one of said modulated signals.

23. The system of claim 1 wherein said modulated signals include an integer carrier frequency offset (CFO) that generates a phase error that is substantially the same in each one of said modulated signals.

24. A physical layer (PHY) module comprising:
the system of claim 1; and
a transceiver module that (i) communicates with said differential demodulation module and (ii) receives said modulated signals.

25. A network device comprising:
the PHY module of claim 24; and
at least one antenna that communicates with said transceiver module.

26. A method, comprising:
generating differentially demodulated signals by differentially demodulating modulated signals using a differential demodulator, wherein said modulated signals include sub-carriers that are modulated using orthogonal frequency domain multiplexing (OFDM);
detecting states of X symbols in said differentially demodulated signals, where each of said X symbols has one of a first state and a second state, and X is an integer greater than 1;
generating cross-correlation values by cross-correlating said states of said X symbols in said differentially demodulated signals with corresponding states of X predetermined symbols in each of Y preamble sequences, where Y is an integer greater than 1,
wherein said cross-correlation values are generated by generating X sums for each of said Y preamble sequences by adding each of said states of said X symbols with said corresponding states of said X predetermined symbols of each of said Y preamble sequences, where said X sums are modulo-2 sums; and
determining whether one of said Y preamble sequences is present in said modulated signals based on said cross-correlation values.

27. The method of claim 26 wherein every $P^{th}$ one of said sub-carriers is modulated with a preamble symbol from one of said Y preamble sequences, where P is an integer greater than or equal to 1.

28. The method of claim 27 further comprising generating said differentially demodulated signals by multiplying a $Q^{th}$ one of said modulated signals by a complex conjugate of a $(Q+P)^{th}$ one of said modulated signals, where Q is an integer greater than or equal to 1.

29. The method of claim 26 wherein every $P^{th}$ one of said sub-carriers has one of substantially the same channel phase and substantially the same differential channel phase.

30. The method of claim 26 further comprising determining said states of said X symbols in said differentially demodulated signals as states of real parts of said differentially demodulated signals when imaginary parts of said differentially demodulated signals are approximately equal to zero.

31. The method of claim 26 further comprising generating said states of said X predetermined symbols in said Y preamble sequences by inverting states of derived symbols in derived preamble sequences that are derived from said Y preamble sequences.

32. The method of claim 31 further comprising generating each of said derived symbols of one of said derived preamble sequences having a first binary value when a corresponding symbol and a symbol adjacent to said corresponding symbol in a corresponding one of said Y preamble sequences have opposite binary values, and having a second binary value that is opposite to said first binary value when said corresponding symbol and said symbol adjacent to said corresponding symbol have the same binary value.

33. The method of claim 31 wherein each of said Y preamble sequences is different from others of said Y preamble sequences, and wherein said derived preamble sequences have a cross-correlation that is less than or equal to a predetermined cross-correlation threshold.

34. The method of claim 33 wherein said predetermined cross-correlation threshold is less than approximately 0.2 for an orthogonal frequency domain multiplexing (OFDM) method using a 1024 fast Fourier transform (FFT) mode.

35. The method of claim 27 further comprising generating said cross-correlation values by adding said X sums generated for each of said Y preamble sequences.

36. The method of claim 35 further comprising selecting a largest one of said cross-correlation values and detecting one of said Y preamble sequences in said modulated signals when said largest one of said cross-correlation values is greater than or equal to a predetermined threshold.

37. The method of claim 36 wherein said predetermined threshold is based on a signal strength of said modulated signals.

38. The method of claim 36 further comprising identifying a segment of a base station that transmitted said modulated signals based on said one of said Y preamble sequences detected in said modulated signals.

39. The method of claim 36 further comprising selecting said largest one of said cross-correlation values based on a signal strength of said modulated signals.

40. The method of claim 36 further comprising generating correlation values by correlating at least one of said differentially demodulated signals and at least one of derived preamble sequences that is derived from said Y preamble sequences.

41. The method of claim 40 wherein said at least one of derived preamble sequences generates at least two of said cross-correlation values that are greater than said predetermined threshold and that are substantially the same.

42. The method of claim 40 further comprising selecting one of said correlation values having a largest real part, detecting one of said Y preamble sequences in said modulated signals based on said largest real part, and identifying a segment of a base station that transmitted said modulated signals based on said one of said Y preamble sequences detected in said modulated signals.

43. The method of claim 40 further comprising selecting one of said correlation values having a largest magnitude, detecting one of said Y preamble sequences in said modulated signals based on said largest magnitude, and identifying a segment of a base station that transmitted said modulated signals based on said one of said Y preamble sequence detected in said modulated signals.

44. The method of claim 36 further comprising generating an estimate for an integer carrier frequency offset (CFO) present in said modulated signals when selecting said largest one of said cross-correlation values.

45. The method of claim 26 wherein said modulated signals include a fractional carrier frequency offset (CFO) that generates a phase error that is substantially the same in each one of said modulated signals.

46. The method of claim 26 wherein said modulated signals include an integer carrier frequency offset (CFO) that generates a phase error that is substantially the same in each one of said modulated signals.

* * * * *